United States Patent
Lehtimäki

[11] Patent Number: 5,953,666
[45] Date of Patent: Sep. 14, 1999

[54] DIGITAL MOBILE COMMUNICATION SYSTEM

[75] Inventor: Matti Lehtimäki, Espoo, Finland

[73] Assignee: Nokia Telecommunications Oy, Espoo, Finland

[21] Appl. No.: 08/836,844

[22] PCT Filed: Nov. 21, 1995

[86] PCT No.: PCT/FI95/00641

§ 371 Date: Jul. 23, 1997

§ 102(e) Date: Jul. 23, 1997

[87] PCT Pub. No.: WO96/16521

PCT Pub. Date: May 30, 1996

[30] Foreign Application Priority Data

Nov. 21, 1994 [FI] Finland ................................ 945470

[51] Int. Cl.[6] .............................. H04Q 7/18; H04Q 7/20; H04Q 7/22

[52] U.S. Cl. ...................... 455/439; 455/432; 455/536; 455/550; 370/328; 370/329; 370/336; 370/345

[58] Field of Search ...................... 455/432, 439, 455/436, 414, 550; 370/331, 332, 335, 441, 479, 493, 506, 328, 329, 336, 345, 522; 375/246, 253

[56] References Cited

U.S. PATENT DOCUMENTS 5,771,452  6/1998  Hanley et al. ........................ 370/336

FOREIGN PATENT DOCUMENTS 489 993  6/1992  European Pat. Off. .
2 257 333  1/1993  United Kingdom .
95/15665  6/1995  WIPO .
95/24789  9/1995  WIPO .

OTHER PUBLICATIONS

"European digital cellular telecommunications system (Phase 2); full rate speech transcoding (GSM 06.10)", European Telecommunication Standard, Sep. 1994, ETS 300 580–2, GMS 06.10, ETSI TC–SMG, ICS: 33.060.30, pp. 2–70.

"Comfort Nosie Aspects For Full Rate Speech Traffic Channels", Jan. 12, 1989, CEPT/CCH/GSM, GSM Recommendation: 06.12, Version 3.0.0, pp. 1–5.

"European digital cellular telecommunications system; Half rate speech Part 3: Substitution and muting of lost frames for half rate speech traffic channels (GSM 06.21):", European Telecommunication Standard, Nov. 1995, ETS 300 581–3, ETSI TC–SMG, Reference: DE/SMG–020621, ICS: 33.060.50, pp. 2–11.

(List continued on next page.)

Primary Examiner—Wellington Chin
Assistant Examiner—Keith Ferguson
Attorney, Agent, or Firm—Pillsbury Madison & Sutro LLP

[57] ABSTRACT

The present invention relates to a digital mobile communication system in which mobile stations (MS) and the fixed network comprise speech coders. The speech coders of the fixed network are located remote from the base stations (BTS) in transcoders (TRCU). In MMC calls, however, the transcoders are controlled to operate so that the frames received from a first base station (BTS) are forwarded with minor modifications through a pair of tandem connected transcoders to a second base station, without carrying out any speech encoding or decoding in the trancoders. Consequently, speech coding is only carried out in the mobile stations, and the speech parameters are simply passed through the mobile communication network, resulting in a significant improvement in the speech quality as compared with the conventional tandem coding.

19 Claims, 3 Drawing Sheets

OTHER PUBLICATIONS

"European digital telecommunications system; Half rate speech Part 4: Comfort noise aspects for the half rate speech traffic channels (GSM 06.22)" European Telecommunication Standard, Nov. 1995, ETS 300 581–4, Source: ETSI TC–SMG, Reference: DE/SMG–020622, ICS: 33.060.50, pp. 2–15.

"Discontinuous Transmission (DTX) For Full Rate Speech Traffic Channels", Jan. 12, 1989, CEPT/CCH/GSM, GSM 06.31, pp. 1120–1124.

Digital cellular telecommunications system; Vocie Activity Detection (VAD) (GSM 06.32), European Telecommunication Standard, Oct. 1996, ETS 300 580–6, 3rd Edition, Source: ETSI TC–SMG, Reference: RE/SMG–020632PR2, ICS: 33.060.50, pp. 2–40.

European digital cellular telecommunications system; Half rate speech Part 5: Discontinuous transmission (DTX) for half rate speech traffic channels (GSM 06.41), European Telecommunication Standard, Nov. 1995, ETS 300 581–5, Source: ETSI TC–SMG, Reference: DE/SMG–020641, ICS: 33.060.50, pp. 2–16.

"European digital cellular telecommunications system (Phase 2); In–band control of remote transcoders and rate adaptors for half rate traffic channels (GSM 08.61)", European Telecommunication Standard, Aug. 1995, prETS 300 598, Source: ETSI TC–SMG, Reference: DE/SMG–030861P, ICS: 33.060.50, pp. 2–39.

"European digital cellular telecommunications system (Phase 2); Substitution and muting of lost frmaes for full rate speech channels (GSM 06.11)", European Telecommunication Standard, Sep. 1994, ETS 300 580–3, Source: ETSI TC–SMG, Reference: GSM 06.11, UDC: 621.396.21, Version 4.0.4.

"Inband Control of Remote Tanscoders and Rate Adaptors", ETSI/TC GSM, Oct. 1990, Recommendation GSM 08.60, Version 3.3.0, pp. 3–29.

Mouly et al., "The GSM System for Mobile Communications", 1992, pp. 216, 232–259.

FIG. 1

| OCTET | BIT NUMBER | | | | | | | |
|---|---|---|---|---|---|---|---|---|
| NUMBER | 1 | 2 | 3 | 4 | 5 | 6 | 7 | 8 |
| 0 | 0 | 0 | 0 | 0 | 0 | 0 | 0 | 0 |
| 1 | 0 | 0 | 0 | 0 | 0 | 0 | 0 | 0 |
| 2 | 1 | C1 | C2 | C3 | C4 | C5 | C6 | C7 |
| 3 | C8 | C9 | C10 | C11 | C12 | C13 | C14 | C15 |
| 4 | 1 | | | | | | | |
| 5 | | | | | | | | |
| 6 | 1 | | | | | | | |
| 7 | | | | | | | | |
| 8 | 1 | | | | | | | |
| 9 | | | | | | | | |
| 10 | 1 | | | | | | | |
| 11 | | | | | | | | |
| 12 | 1 | | | | | | | |
| 13 | | | | | | | | |
| 14 | 1 | | | | | | | |
| 15 | | | | | | | | |
| 16 | 1 | | | | | | | |
| 17 | | | | | | | | |
| 18 | 1 | | | | | | | |
| 19 | | | | | | | | |
| 20 | 1 | | | | | | | |
| 21 | | | | | | | | |
| 22 | 1 | | | | | | | |
| 23 | | | | | | | | |
| 24 | 1 | | | | | | | |
| 25 | | | | | | | | |
| 26 | 1 | | | | | | | |
| 27 | | | | | | | | |
| 28 | 1 | | | | | | | |
| 29 | | | | | | | | |
| 30 | 1 | | | | | | | |
| 31 | | | | | | | | |
| 32 | 1 | | | | | | | |
| 33 | | | | | | | | |
| 34 | 1 | | | | | | | |
| 35 | | | | | | | | |
| 36 | 1 | | | | | | | |
| 37 | | | | | | | | |
| 38 | 1 | | | | | | C16 | C17 |
| 39 | C18 | C19 | C20 | C21 | T1 | T2 | T3 | T4 |

DIGITAL MOBILE COMMUNICATION SYSTEM

This application is the national phase of international application PCT/FI95/00641 filed Nov. 21, 1995 which designated the U.S.

FIELD OF THE INVENTION

The present invention relates to a digital mobile communication system in which mobile stations and the fixed network comprise speech coders, the speech coders of the fixed network being located remote from the base stations in transcoders, and especially to controlling the transcoders in a mobile to mobile call.

BACKGROUND OF THE INVENTION

In recent years, digital mobile communication systems for fully digital speech and data transmission have been introduced, resulting in a uniform quality of speech. As far as the mobile communication network is concerned, the most limited resource is the radio path between the mobile stations and the base stations. To reduce the bandwidth requirements of a radio connection on the radio path, speech transmission utilizes speech encoding providing a lower transmission rate, for example 16 or 8 kbit/s instead of the 64 kbit/s, transmission rate typically used in telephone networks. For speech encoding, both the mobile station and the fixed network end must have a speech encoder and a speech decoder. On the network side, the speech coding functions may be located in several alternative places, for example at the base station or in the mobile services switching center. The speech encoder and decoder are often located remote from the base station in so called remote transcoder units. In the latter case, speech encoding parameters are sent between the base station and the transcoder unit in specific frames.

In each mobile originating or mobile terminating speech call, a remote transcoder is connected to the speech connection on the network side The remote transcoder decodes the mobile originating speech signal (uplink direction), and encodes the mobile terminating speech signal (downlink direction). This type of an arrangement causes no problems as long as only one of the speech participants is a mobile station and the other, for example, a subscriber of a public switched telephone network (PSTN).

If the call takes place between two mobile stations (Mobile to Mobile Call, MMC), the operation of the mobile communication network involves a remote transcoder on the connection between the calling mobile station and the mobile services switching center, and, correspondingly, a second remote transcoder between the called mobile subscriber and the (same or another) mobile services switching center. These remote transcoders are then interconnected by the mobile services switching center (centers) as a result of normal call switching. In other words, for each MMC call there are two transcoder units in a series connection, and speech encoding and decoding are performed twice for the call. This is known as tandem coding. Tandem coding presents a problem in mobile communication networks as it degrades the speech quality due to the extra speech encoding and decoding. So far, tandem coding has not been a major problem because relatively few calls are MMC calls. However, as the number of mobile stations increase, the number of MMC calls will also be higher and higher.

A DISCLOSURE OF THE INVENTION

It is an object of the present invention to prevent tandem coding and consequently to improve speech quality in mobile to mobile calls.

This object is achieved by a digital mobile communication system comprising mobile stations and first speech coders in said mobile stations, a radio network including base stations and second speech coders, said second speech coders being remote from the base stations in transcoders which communicate with the base stations by transmitting frames containing control information and speech coding information, and in which mobile communication system the uplink direction is the traffic direction from the base station to the transcoder and the downlink direction is the reverse direction. The mobile communication network according to the invention is characterized in that the uplink frames from the base stations of the calling and called mobile station contain a speech coding disabled indicator in a mobile to mobile call, the transcoder is responsive to the occurrence of said speech coding disabled indicator in an uplink frame received from the base station, for not carrying out the speech decoding for the speech information of the frame in the uplink direction and the speech encoding in the downlink direction, and forwards the frame, possibly modified according to the control information in the respective uplink frame, further to a second transcoder or base station.

In the preferred embodiment of the present invention, an MMC call can be connected according to the normal procedures of the mobile communication network so that the connection has two transcoders in a tandem configuration. In a second embodiment of the invention, the speech coding functions are distributed in a new way between the tandem connected transcoders, and in a third embodiment the speech coding functions are combined into one transcoder. Tandem coding can be avoided in the MMC calls by forwarding the frames that are rfsceived from a first base station, with minor modifications through two tandem connected transcoders to a second base station without the transcoders carrying out any speech encoding or decoding. Consequently, speech encoding is carried out solely in the mobile stations, and the speech parameters are simply passed through the mobile communication network, which considerably improves speech quality compared to the conventional tandem coding. The transcoders are informed of the fact that they are to operate in the anti-tandem prevention mode. This may, for example, be accomplished by providing the frames sent from the base stations to the transcoders (uplink frames) with information that the frames are associated with an MMC call and speech decoding is not to be carried out for them. The frames are sent forward from the transcoder to a second transcoder. Thus, the decision on the handling of each frame is based on the information in the particular frame. Furthermore, the frame handling may vary according to control information contained in them. As examples of special handling, bad frame handling and discontinuous transmission (DTX) are mentioned.

An advantage of the invention is the possibility for the mobile communication network to utilize the existing network elements and transcoder architecture, such as a remote transcoder. It is possible to implement the invention with insignificant modifications to present mobile communication networks. Above all, the target of the modifications is the information within the frames and the frame handling in the transcoders. In principle, it is possible to have control over such modifications by similar modification procedures as in a case where a new coding method, such as half rate coding, is introduced in a mobile communication network.

By the present invention, prevention of tandem coding can easily be implemented in various kinds of discontinuous transmission modes (DTX).

The prevention of tandem coding according to the invention may be used either within one mobile services switching center or, if the required signalling is forwarded between mobile services switching centers, the method according to the invention may be used in all MMC calls. The mobile services switching center has the information that the call will be an MMC, and it signals this information to the other network elements.

BRIEF DESCRIPTION OF THE DRAWINGS

In the following, the invention will be described by means of the preferred embodiments with reference to the accompanying drawings, in which.

THE PREFERRED EMBODIMENTS OF THE INVENTION

The present invention can be applied to any mobile communication system which utilizes digital speech transmission and speech encoding techniques reducing the transmission rate. A speech coding unit associated with the speech coding techniques located remote from the base station in, for example, the mobile services switching center or the base station controller. The speech coding techniques further involve sending the coded speech signal between the transcoder and the base stations in frames.

One example is the European digital cellular mobile communication system GSM (Global system for Mobile Communications) which is becoming a world-wide standard for mobile communication systems. The basic elements of the GSM system are described in the GSM Recommendations. For a closer description of the GSM system, the GSM recommendations and "The GSM System for Mobile Communications", by M. Mouly & M. Pautet, Palaiseau, France, 1992, ISBN: 2-9507190-0-7 is referred to.

The GSM and a modification thereof, DCS1800 (Digital Communication System) operating at the 1800 Mhz frequency range, are the primary targets for the invention, but it is not intended that the invention be restricted to these radio systems.

Figure 1:
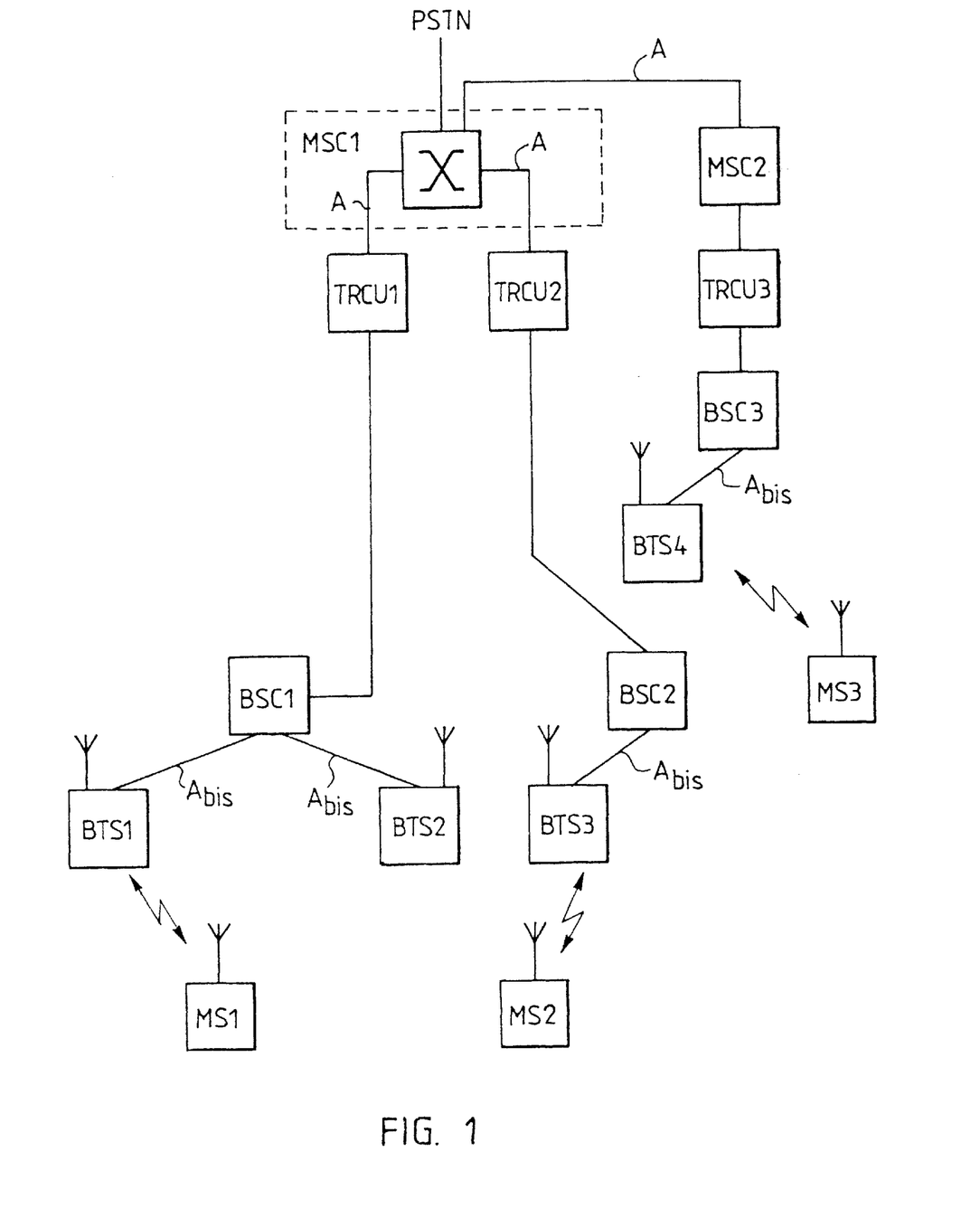
FIG. 1 shows a mobile communication system according to the invention.

FIG. 1 very briefly describes the basic elements of the GSM system. A mobile services switching centre MSC handles the connecting of incoming and outgoing calls. It performs functions similar to those of an exchange of a public switched telephone network (PSTN). In addition to these, it also performs functions characteristic of mobile communications only, such as subscriber location management. The mobile stations MS are connected to the center MSC by base station systems. The base station system consists of a base station controller BSC and base stations BTS. One base station controller is used to control several base stations BTS.

The GSM system is entirely digital, and speech and data transmission are also carried out entirely digitally, which results in a uniform quality of speech. In speech transmission, the current speech encoding method in use is the RPE-LTP (Regular Pulse Excitation—Long Term Prediction) which utilizes both short and long term prediction. The coding produces LAR, RPE and LTP parameters which are sent instead of the actual speech. Speech transmission is dealt with in the GSM recommendations in chapter 06, and speech encoding particularly in the recommendation 06.10. In the near future, other coding methods will be employed, such as half rate methods, with which the present invention can be used as such. As the actual invention does not relate to the speech encoding method, and as it is independent of it, any speech coding method will not be described in any further detail herein.

Naturally, the mobile station must have a speech coder and decoder for speech coding. As the implementation of the mobile station is neither essential to the present invention nor unusual, it is not dealt with here in any closer detail.

1. Transcoder and TRAU Frames

On the network side, various functions relating to speech coding and rate adaptation are concentrated in a transcoder unit TRCU (Transcoder/Rate Adaptor Unit). The TRCU may be located in several alternative locations in the system according to choices made by the manufacturer. The interfaces of the transcoder unit include 64 kbit/s PCM (Pulse Code Modulation) interface towards the mobile services switching center MSC (A interface), and a 16 or 8 kbit/s GSM interface towards the base station BTS. Relating to said interfaces, the terms uplink and downlink are also used in the GSM recommendations, the uplink being the direction from the base station BTS to the mobile services switching center MSC, while the downlink is the reverse direction.

In cases the TRCU is placed remote from a base station BTS, information is sent between the base station and the transcoder/rate adaptor unit TRCU in so-called TRAU frames. The TRAU frame includes 320 bits according to the recommendation 08.60 and 160 bits according to the forthcoming recommendation 08.61. There are presently four different frame types defined according to information content in them. These are speech, operations/maintenance, data, and the so-called idle speech frame.

Typically, the transcoder unit TRCU is located at the mobile services switching center MSC, but it may also be a part of a base station controller BSC or a base station BTS. A transcoder unit placed remote from the base station BTS must receive information on the radio interface for efficient decoding. For such control and synchronization of the transcoder, a special kind of in-band signalling is used on the 16 kbit/s channel between the base station and the transcoder unit. This channel is also used for speech and data transmissions. Such remote control of a transcoder unit is described in the GSM recommendation 08.60. To carry out synchronization, the first two octets of each frame comprise 16 synchronization bits. In addition, the first bit of the 16-bit words (2 octets) that constitute a frame is a synchronization check bit. In addition to the bits containing the actual speech, data or operation/maintenance information, each frame comprises control bits in which information of the frame type and a varying amount of other frame-type-specific information is conveyed. Furthermore, the last four bits T1–T4 of, for example, speech and idle frames are assigned for the above mentioned time alignment.

Figure 2:
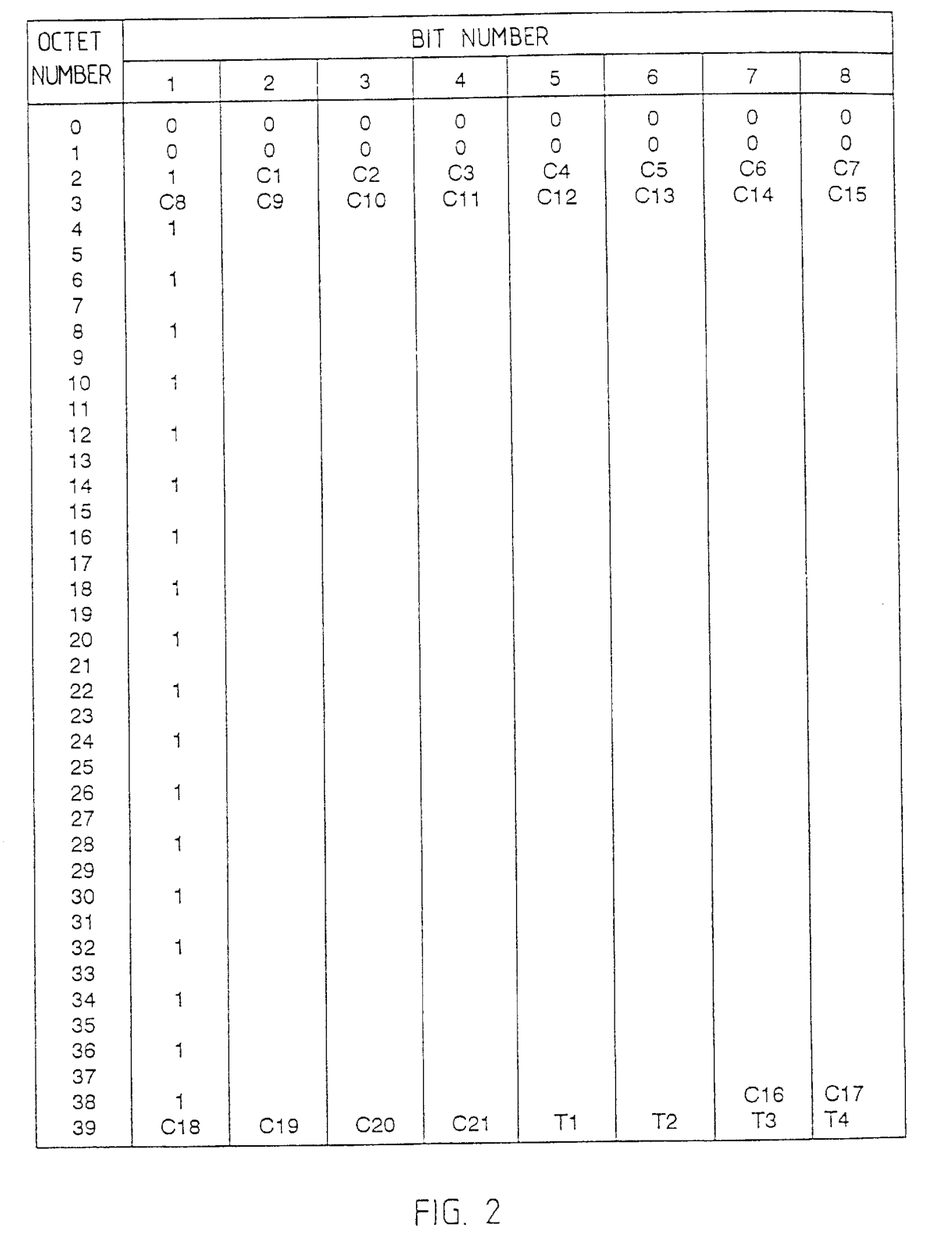
FIG. 2 shows a TRAU speech frame in accordance with the GSM Recommendation 8.60.

FIG. 2 illustrates a TRAU speech frame having 21 control bits C1–C21 and, in addition, the last 4 bits T1–T4 of the frame are assigned for time alignment. The actual speech information bits are in the octets 4–38. In practice, the speech information consists of LAR, RPE and LTP parameters of the RPE-LTP (Regular Pulse—Long Term Prediction) speech encoding method. The idle speech frame is similar to the speech frame illustrated in FIG. 2, except that all the traffic bits of the frame are in logic state "1".

The GSM recommendation 8.60 defines control bits as follows. The bits C1–C4 determine the frame type, i.e. C1C2C3C4=1110=downlink speech frame and C1C2C3C4=0001=uplink speech frame. Bit C5 determines the channel type, i.e. C5=0=full rate channel and C5=1=half rate channel. Bits C6–C11 are control bits for time alignment. Bits C12–C15 are frame indicators for uplink direction, and C16 is the frame indicator for downlink direction, primarily relating to discontinuous transmission. The coding and use of the frame indicators are described in the GSM recommendations 08.60 and 06.31. C12 is a Bad Frame Indicator BFI, which is also used in continuous transmission, i.e. BFI=0=good frame and BFI=1=bad frame. C13–C14 establish the SID code (Silence Descriptor). C15 is a time alignment bit TAF. C17 is a downlink DTX bit indicating whether the discontinuous transmission DTX is in use in the downlink (DTX=1) or not (DTX=0). Bits C18–C21 are spare bits in the uplink direction. C16 is a SP bit indicating in the downlink direction whether said frame comprises speech. In the downlink direction, the other control bits are spare bits.

For the recommendation 08.60, a newer GSM recommendation 08.61 is currently being prepared, in which several TRAU frame types are also defined, but in which is the control bits used differ from the ones of the GSM recommendation 08.60. All the basic solutions relating to the invention of this application can, however, easily be implemented in a mobile communication system according to the GSM recommendation 08.61.

2. Discontinuous Transmission DTX

Discontinuous transmission DTX refers to a method by which a transmission on the radio path may be interrupted for the duration of pauses in speech. The aim is to decrease transmitter power consumption, a prime concern for mobile stations, and general noise level on the radio path, which effects the system capacity. DTX causes certain distinctive features in the anti-tandem operation of the present invention, and thus the following at first examines an ordinary DTX by using the GSM system as an example.

The discontinuous transmission is carried out by means of three major elements. On the transmitting side, a Voice Activity Detection VAD is required, which is used for checking whether a signal under examination contains speech or solely background noise. The VAD function is determined in the GSM recommendation 6.32 and it is basically based on analysis of signal energy and spectral changes. In addition, a function for calculating the background noise parameters is required on the transmitting side. On the basis of the noise parameters obtained from the transmitting side, so-called comfort noise is generated on the receiving side in order not to subject the listener to unpleasant switching between speech with background noise and total silence. All the elements of discontinuous transmission are largely based on a RPE-LTP speech codec implementing and its internal variables.

2.1 Functions of Transmitting Side Transcoder Downlink DTX)

Figure 3:
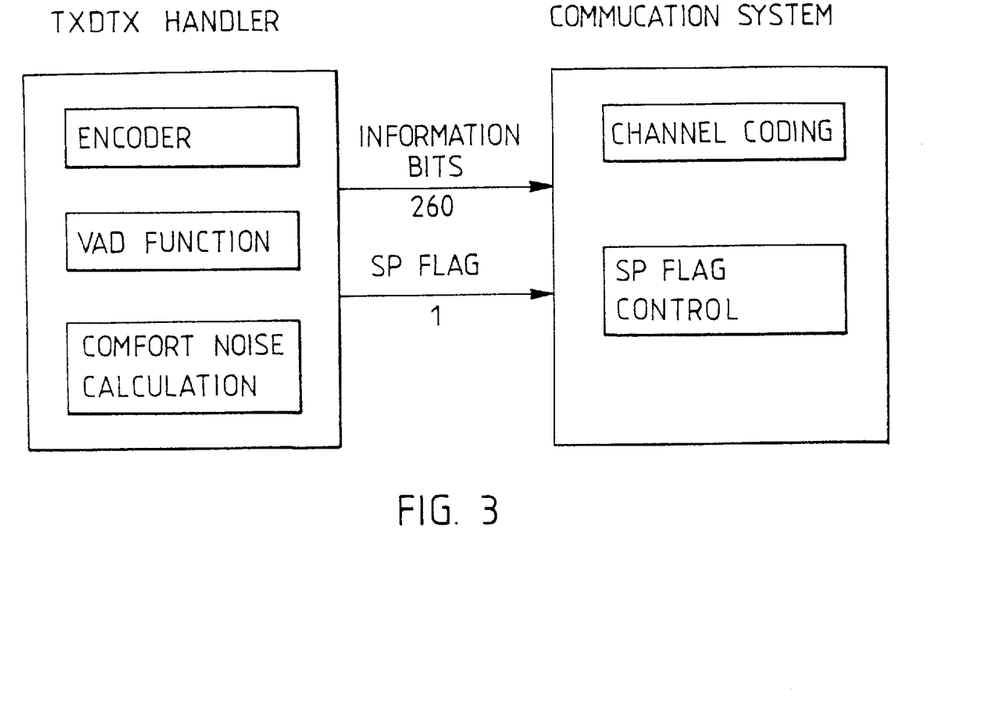
FIGS. 3 and 4 show the block diagrams of TXDTX and RXDTX handlers.

The function which handles the discontinuous transmission on the transmitting side, i.e the TXDTX handler (Transmit DTX), is illustrated in FIG. 3. It sends speech frames to the communication system continuously. The speech frames are marked with an SP (Speech) flag in the control bits, indicating whether said frame includes speech or whether it is a so-called SID frame (Silence Descriptor) which contains information on the background noise for comfort noise generation on the receiving end. The SP flag is determined on the basis of a VAD flag obtained from a voice activity detection unit. As the VAD flag goes to zero, indicating that no speech is detected in the signal, a transition of the SP flag into zero will also occur after the number of frames required for calculating the background noise parameters. The transmitting unit of the radio system further sends this frame, which is marked by zero SP flag and includes the noise parameters, after which transmission on the radio path is discontinued. The TXDTX handler does, however, continue to send frames containing noise information to the radio system which, at predetermined time intervals, sends one of them over the radio path in order to update the noise parameters of the receiving side. When speech is again detected in the signal, the SP flag is set to 1 and continuous transmission is recommenced.

In discontinuous transmission, a function is thus required on the transmitting side for calculating the background noise parameters. The aforementioned encoder at the transmitting side generates the parameters that represent background noise. Out of the normal parameters, those parameters that provide information on the level and spectre of the noise are selected to represent background noise, i.e. block maxims and reflection coefficients, which have been converted into LAR coefficients. Over a time period of four speech frames, average values are further calculated for the selected parameters. One common value of four block maxims is calculated over the time period of four speech blocks. These parameters are transmitted over the radio path as described above. Thus, only part of the speech parameters are sent, and some of the parameters are substituted for a SID code word which consists of 95 zeros. The rest of the parameters that are not used are coded to 0.

2.2 Receiving Side Functions (Transcoder Uplink DTX)

Figure 4:
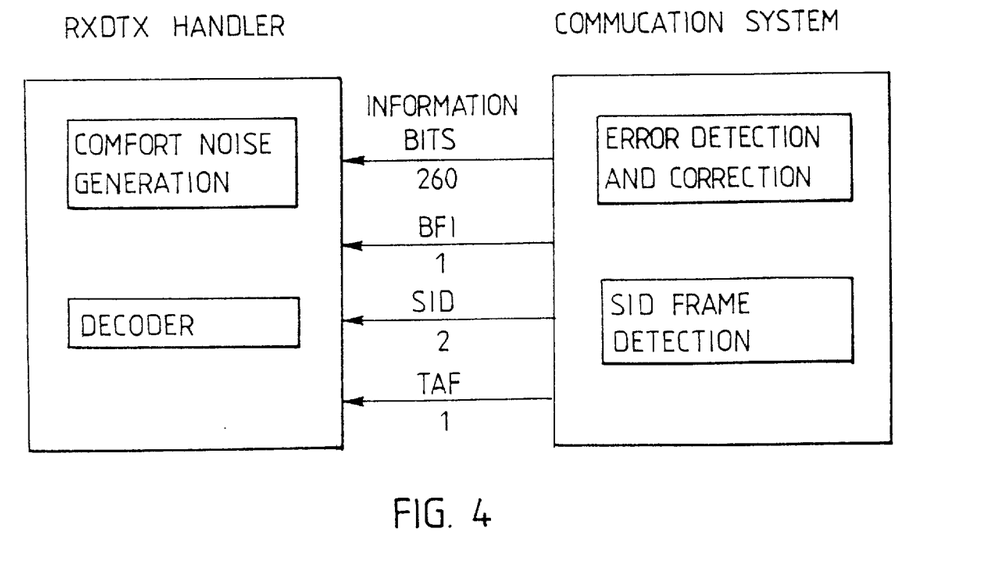

The discontinuous transmission of the receiving side is correspondingly handled by a RXDTX (Receive DTX) handler whose structure is illustrated in FIG. 4. It receives frames from the radio system, and handles them on the basis of the three flags obtained in the control bits.

The BFI flag (Bad Frame Indicator) indicates whether the frame in question contains sensible information. I.e. if the frame has been corrupted, for example, on the radio path in such extent that it cannot be reconstructed in the radio section of the base station, the BFI flag is used for marking said frame defective. As such a bad frame is received, i.e. a frame with a BFI flag value 1, the speech parameters of said frame are substituted for the speech parameters of the previous frame before decoding. If several frames that are marked by a BFI flag are received, muting operations according to the GSM recommendations are performed. The only exception to the aforementioned handling of a BFI flag is an uplink-DTX situation, i.e. a valid SID updating frame has been received, but no normal speech frame with a BFI value 0 has been received after that. In such an uplink DTX situation, a frame with a BFI flag only means that comfort noise generation should be continued. Alternatively, this can be carried out by sending idle frames.

The SID flag consists of two bits and it is used for classifying the SID frame sent by the radio system based on errors in the specifically formed code word in the frame. A decision is made on the basis of this classification on how the frame will later be used. If the SID has the value 2 and the BFI has the value 0, it is a valid SID frame that can be used for updating the noise parameters.

A TAF flag (Time Alignment Flag) is used for indicating whether the frame in question has been used in signalling outside of this sub-system, i.e. its purpose is mainly to indicate when the next SID updating is expected.

The operations relating to comfort noise generation, such as muting, are carried out in accordance with the GSM recommendations 06.11 or 06.21 and 06.21 or 06.22 and 06.31 or 06.41 depending on the combinations of the aforementioned three flags, but generally speaking it can be said that the comfort noise generation is started or comfort noise is updated upon receiving a new valid SID frame.

The comfort noise generation correspondingly employs the decoder described above for generating background noise. The averaged parameters received from the transmitting side are used in the normal manner, and they are maintained unchanged until the next updating. The other parameter values are set so that the location of a decimation grid and 13 RPE samples are frame-specifically allotted integers uniformly distributed within the range 0–3 and 1–6, respectively. The delay parameter a of the long term residual signal is set in the sub-frames to values 40, 120, 40, 120, in that order, i.e. the minimum and maximum values in turn, and the gain parameter of the long term residual signal is set to zero in all the subframes.

3. Prior Art MMC Call

When a mobile station MS originating call is made in the prior art mobile communication system, the associated signalling is forwarded from a base station BTS to a mobile services switching center MSC which in turn establishes connection, for example, between the PSTN line and the line of the aforementioned A interface. At the same time, the transcoder unit TRCU is allocated and connected to the A interface line. The mobile services switching center MSC further commands the base station controller BSC to connect the base station BTS, which the calling mobile station MS communicates with, to the A interface line allocated. The base station controller BSC establishes connection between the A interface line and the base station BTS which the calling MS communicates with. The base station BTS independently handles call establishment on the radio path. Thereby, a connection is established having in series a mobile station MS, a base station BTS, a base station controller BS, a transcoder unit TRCU and a mobile services switching center MSC. Thus, this connection is used for sending coded speech between MS-TRCU, and TRAU frames between BTS-TRCU.

If the prior art mobile communication system handles a MMC (Mobile to Mobile Call) between two mobile stations MS, the call connecting proceeds, as far as the calling mobile station is concerned, similarly to above, but now the mobile services switching center establishes the connection between the A interface line allocated for the calling MS and the A interface line allocated for the called MS. The A interface line of the called MS is connected to a second transcoder unit. From said second transcoder unit, a connection will be established to the base station of the called mobile station MS. In other words, for each MMC call two transcoder units are connected in series and the call is encoded and decoded twice. This is known as tandem coding, which deteriorates speech quality due to the extra encoding and decoding.

4. MMC Call According to the Invention

In the present invention, an MMC call can be connected according to normal procedures of the mobile communication network so that the connection comprises two transcoders TRCU in a tandem configuration. Tandem coding can be avoided in MMC calls by sending the frames received from a base station BTS with minor changes through said two tandem coded transcoders TRCU to a second base station BTS without the transcoders carrying out any speech encoding or decoding. As a result, speech encoding is only carried out in the mobile station MS and the speech parameters are simply forwarded through the mobile communication network, which considerably improves speech quality compared to the conventional tandem coding.

The transcoders can implement several different coding types, such as full rate and half rate, and contain an anti-tandem mode according to the invention for each coding type. Alternatively, transcoders TRCU representing different types may be grouped in pools from which an appropriate transcoder may be selected on a call by call basis.

An Abis interface may be maintained the same with the exception of the additions to the signalling procedures described here. In the TRAU frames of the Abis interface, the only additions in the primary embodiment of the invention will in the uplink be indication of the anti-tandem mode, and in the downlink informing of lack of synchronization or synchronization errors in the A interface, as will be described below.

The following will describe an arrangement according to the preferred embodiment of the invention for preventing tandem coding in an MMC call within one mobile services switching center MSC. For reasons of clarity, a three-part description will be given: uplink transfer BTS-TRCU, transfer between transcoders TRCU-TRCU, and downlink transfer TRCU-BTS.

At first, in FIG. 1 it is assumed that there is within a base station BTS1 coverage area a mobile station MS1 which initiates an MMC call set up to a second mobile station MS2 which is located within a coverage area of a base station BTS3. In such a case, the normal call establishment for a mobile originating call MOC is carried out according to the GSM recommendations. The call establishment involves signalling between the MS1 and the base station controller BSC1, as well as signalling between mobile services switching center MSC1 and the visitor location register VLR (not shown) for the purpose of subscriber authentication and exchange of encryption keys. The MSC1 receives from the MS1 the directory number of the B subscriber, and as it notices that the B subscriber is another mobile subscriber it performs an interrogation according to the GSM recommendations to the home location register HLR (not shown) of the B subscriber. Due to the fact that the B subscriber is within the MSC1 area, the HLR responds by giving the MSC1 as the routing address. Consequently, the MSC1 performs, according to the GSM recommendations, call establishment of a mobile terminating call MTC, which call establishment involves a database enquiry to a visitor location register VLR, paging of the mobile station MS2, authentication, exchange of encryption keys, etc.

The MSC1 reserves a dedicated A interface line for both mobile stations MS1 and MS2. In addition, the MSC1 reserves the transcoder unit TRCU1 for the MS1, and for the MS2 the transcoder TRCU2 which is connected to the corresponding A interface lines. The MSC1 establishes the connections MS1-TRCU1 and MS2-TRCU2 as well as a connection between the A interface line which is allocated for the MS1 and the A interface line which is allocated for the MS2. Thus, between the MS1 and the MS2 there is a speech connection having two transcoders TRCU1 and TRCU2 connected in series.

In the call establishment, GSM recommendations are strictly followed except that as the MSC1 detects an MMC call and a need for preventing tandem coding it signals information concerning it to the base stations BTS1 and BTS3. This piece of information may be included in some existing messages.

4.1. Uplink Transfer BTS-TRCU

In the following, only the uplink transfer BTS1-TRCU1 is described. The uplink transfer BTS3-TRCU2 is carried out by the very same principle. As the BTS1 channel codec unit CCU, determined in the GSM recommendation 08.60, receives information on the tandem prevention mode, it provides the uplink TRAU frames with information that indicates to the transcocer TRCU1 that the frames are associated with an MMC call and no speech decoding is to be carried out to them. This information can be transferred in one of the free contrcol bits C18–C21 of the uplink TRAU frame, or a combination of them. For the anti-tandem operation, it is also possible to determine a new frame type, of which control bits C1–C4 notify. In the primary embodiment of the invention, anti-tandem mode is indicated by the control bit C21, i.e. C21=0=anti-tandem mode and C21=1= normal mode.

As the transcoder TRCUI receives the TRAU speech frame from the base station BTS1, it checks the state of the control bit C21 in the frame. If the state of the control bit C21 were 1, the TRCU1 would in the normal manner carry out all the procedures as defined in the GSM recommendations, including speech decoding, to the received TRAU frame.

If, however, the BTS1 has set the TRAU frame control bit C21=0, the TRCU1 goes to anti-tandem mode. In the anti-tandem mode, the TRCU1 handles the TRAU frames it receives from the base station BTS1, as will be described below in connection with the transcoder TRCU1, and knows the information received from the A interface to be TRAU frames and handles them in the downlink direction, as will be described below in connection with the transcoder TRCU2.

In anti-tandem mode, the TRUC1 carries out all the functions determined by the GSM recommendations, except decoding, and produces a TRAU frame in accordance with the GSM recommendation 08.60 (or 08.61) to be forwarded through the A interface to a second transcoder. As decoding is not performed, the TRAU frames that are forwarded to the A interface comprise essentially the same speech parameters and control data as the frames received from the base station BTS1. The TRCUL does, however, check the control bits of the received TRAU frame and may depending on their contents carry out additional functions which may change the contents of the TRAU frames that are sent to the A interface.

Upon receiving a bad uplink TRAU frame, in other words a TRAU frame marked with a BFI flag value 1, the TRCU1 substitutes the speech parameters of said uplink TRAU frame with the speech parameters of the previous uplink TRAU frame and sets the value of the BFI flag to 0 prior to sending said TRAU frame forward to the A interface and TRCU2. If several uplink TFLU frames that are marked with a BFI flag are received, muting procedures according to the GSM recommendations are carried out to the values of the speech parameters, and the BFI flag values are set to 0 in the bad TRAU frames prior to their sending to the A interface, but decoding is not performed in this case either.

The only exception is a situation of an uplink TDX whereby an idle speech frame or a TRAU frame marked with a BFI flag value 1 only mean that the TRUC1 should continue generating comfort noise.

When the TRCU1 receives a valid SID updating, it functions the way it does in a normal uplink DTX situation, i.e. comfort noise generation is activated or comfort noise is updated to the parameters, but decoding is yet again not performed.

In a nutshell, it can be said that all the operations determined by the GSM recommendation 06.11 or the forthcoming recommendation 06.21 are performed with the exception of decoding, and the BFI flag is set to 0 and the uplink DTX is handled as follows. Upon reception of SID frames according to the GSM recommendation 06.31 or the forthcoming recommendation 06.41, comfort noise generation according to the GSM recommendation 06.12 or the forthcoming recommendation 06.22 is performed, but again in such a manner that decoding is not carried out, but the modified parameters are packed back to the frames. Control bits are not changed at all in these flags that will be sent forward to the A interface.

In the TRAU frames according to the forthcoming GSM recommendation 08.61, the control bits further comprise a UFI flag and a check sum for cyclic redundancy check (CRC), which may cause changes in the speech parameters of the received TRAU frame prior to sending the TRAU frames forward to the A interface. For the TRAU frames in accordance with the GSM recommendation 08.61, the transcoder TRCU1 must, among other things, calculate a new CRC check sum in case it has been necessary to change the parameters associated with it.

4.2. Transfer between Transcoders, TRCU—TRCU

Information is transferred from the transcoder TRCU1 to the transcoder TRCU2 through the A interface by using TRAU frames in accordance with the GSM recommendations 08.60 or 08.61. The transfer between the transcoders TRCU1 and TRCU2 additionally employs the same synchronization methods of the GSM recommendations 08.60 or 08.61 that were used between the base station BTS1 and the transcoder TRCU1. In other words, the TRCU2 synchronizes into the TRAU frames it receives from the A interface by means of the synchronization bits within the frames.

The TRCU2 handles the uplink TRAU frames it receives from the base station BTS3 the same manner as described above in connection with the transcoder TRCU1, and goes to anti-tandem mode upon detecting that C21=0. Similarly, on the basis of the type of TRAU frames received from the base station BTS3 direction, the TRCU2 chooses an appropriate mode of operation for handling the A interface information. In other words, as the TRCU2 receives from the base station TRAU frames that are marked with the control bit C21=01 to be forwarded to the A interface in the tandem prevention mode, the TRCU2 knows that the data from the A interface should consist of TRAU frames, too. If the TRCU2 notes that the data received from the TRCU1 through the A interface is not in the form of TRAU frames, the TRCU2 signals information about this fact to the BTS3 in the downlink, as soon as a predetermined time-out has expired. This information can be transferred by using a free control bit, for example a free TRAU frame bit, such as bit C13 of the GSM recommendation 08.60. The BTS signals in the uplink direction information on the error situation to the mobile services switching center MSC which ascertains that the BTS1 functions in the anti-tandem mode and/or changes transcoder TRCU1. Time supervision is performed by a timer which is activated upon going to tandem prevention mode. If the timer value exceeds a predetermined threshold value, and no TRAU frames are received from the A interface, time supervision expires.

4.3. Downlink Transfer TRCU-BTS

In the following, only downlink transfer TRCU2-BTS3 will be described. The very same principle can be applied to the downlink transfer BTS1-TRCU1.

In the tandem prevention mode, the TRCU2 receives TRAU frames from the A interface and carries out all the procedures determined for it in the GSM recommendations, except speech encoding, and produces a TRCU frame in accordance with the GSM recommendation 08.60 (or 08.61) to be forwarded through Abis interface to the BTS3. As the speech encoding is not carried out, the TRAU frames to be forwarded contain essentially the same speech parameters and control data as the TRAU frames received through the A interface. The TRCU2 does, however, check the control bits of the TRAU frame received from the A interface and may depending on their contents carry out additional functions which may change the contents of the TRAU frames that are sent to the BTS3.

If the TRCU2 by means of the uplink TRAU frames sent by the BTS3, or by some other means, is set in downlink DTX off mode, the TRCU2 forwards the TRAU frames received from the A interface by only changing the type of the frames to that of normal downlink speech frames. In other words, in the frames according to the GSM recommendation 08.60, the TRCU sets the control bits C1–C4 to indicate that the TRAU frame is a downlink frame, i.e. C1C2C3C4=1110, and the SP bit and the spare bits always to 1.

If the downlink DTX is set on, the TRAU frames are sent forward by changing the type of the TRAU frames received from the A interface to that of normal downlink speech frames, if they are normal speech frames as to their control information. In all the TRAU frames received from the A interface that can, on the basis of control bits, be interpreted as comfort noise generation frames, i.e. in frames that the TRUC1 would interpret as belonging to comfort noise generation frames of the uplink DTX, the SP flag is kept 0 and a SID code word is set to unnecessary speech parameters, and the rest of the unnecessary parameters are also set to 0. As a normal speech frame is received from the A interface, the SP is again set to 1 in these downlink frames.

It is also possible to transfer the functions of the transcoders TRCU1 and TRCU 2 described above so that the TRCU2 carries out all the modifications to the frames received from the BTS1, and the TRCUI carries out all the modifications to the TRAU frames received from the BTS2 whereby a configuration slightly different regarding the location of the functions is obtained. In such a case the TRCU1 forwards the uplink frames as such to the TRCU2, and the TRCU2 correspondingly to the TRUC1.

Furthermore, it is possible to combine the TRCU1 and the TRCU2, i.e. to transfer all the features of the TRCU2 to the TRCU1, which makes it feasible to carry out all the functions described above by just one TRAU unit. This can easiest be understood by taking all the TRUC1 and TRCU2 features described above, and placing them as one unit to replace the TRCU1. At the higher level, this can only be noticed by the fact that in the coding prevention mode the MSC1 takes care that the second TRAU unit is not connected but the channel is connected through.

The example above describes an MMC call within the area of one mobile services switching center MSC1. The invention can also be applied to an MMC call with mobile stations MS located in different mobile services switching centers.

Let us assume that in the system according to FIG. 1 a MS1 located within the area of a base station BTS1 and a mobile services switching center MSC1 places a call to a mobile station MS3 located within the area of a base station BTS4 and mobile services switching center MSC2. The beginning of the MMC call proceeds as in the previous example, but now the home location register HLR returns the address of the mobile services switching center MSC2 to the mobile services switching center MSC1. The MSC1 routes the call to the MSC2 and includes information in the signalling that the call is an MMC call. The MSC1 performs the allocation of the transcoder TRCU1 and the call establishment to the mobile station MS1 direction, as in the previous example. The MSC2, in turn, allocates the transcoder TRCU3 and carries out the call establishment to the mobile station MS3 the same way that the MSC1 performed the allocation of the transcoder TRCU2 and the call establishment to the mobile station MS2 in the previous example. A connection is established between the mobile services switching centers MSC1 and MSC2, and the transcoders TRCU1 and the TRCU3 are connected in series. Following this, the TRAU frame unlink transfer between BTS-TRCU, the downlink transfer between TRCU-BTS and the transfer between the transcoders are performed, as in the previous example.

The Figures and their description are only intended to illustrate the present invention. It should, however, be understood that changes can be made to the primary embodiments of the invention without departing from the scope and spirit of the attached claims.

I claim:

1. A digital mobile communication system comprising mobile stations and first speech coders in said mobile stations, a radio network including base stations and second speech coders, said second speech coders being remote from the base stations in transcoders which communicate with the base stations by transmitting frames containing control information and speech coding information, and in which mobile communication system the uplink direction is the traffic direction from the base station to the transcoder and the downlink direction is the reverse direction, characterized in that the uplink frames from the base stations of the calling and called mobile station contain a speech coding disabled indicator in a mobile to mobile call, the transcoder is responsive to the occurrence of said speech coding disabled indicator in an uplink frame received from the base station, for not carrying out the speech decoding for the speech information of the frame in the uplink direction and the speech encoding in the downlink direction, and forwards the frame, possibly modified according to the control information in the respective uplink frame, further to a second transcoder or base station.

2. A mobile communication radio system as claimed in claim 1, characterized in that a radio network allocates in a mobile to mobile call a first transcoder for the calling mobile station and a second transcoder for the called mobile station, and connects them in series, transcoders are responsive to the occurrence of said speech coding disabled indicator in the received uplink frames, for not carrying out speech decoding in the first transcoder, forwarding the undecoded speech coding information in the frames to a second transcoder, not carrying out speech encoding in the second transcoder, and inserting the speech information received in the frames from the first transcoder into downlink frames.

3. A mobile communication system as claimed in claim 1, characterized in that the mobile communication network allocates in a mobile to mobile call a first transcoder for the calling mobile station and a second transcoder for the called mobile station, and connects them in series, the first transcoder is responsive to the occurrence of said speech coding disabled indicator in the received uplink frames, for not carrying out speech decoding, and forwards the uplink frames unchanged to the second transcoder, the second transcoder is responsive to the occurrence of said speech coding disabled indicator received in the uplink frames of the base station of the called mobile station, for not carrying out speech decoding and encoding, and forwarding the speech information of the uplink frames received from the first transcoder, possibly modified according to the control information of said uplink frame, to the base station of the calling mobile station in the downlink frames.

4. A mobile communication system as claimed in claim 1, characterized in that the mobile communication network allocates in a mobile to mobile call one combined transcoder which handles the frames received from the base stations of both the calling and the called mobile station, the combined transcoder is responsive to the occurrence of said speech encoding prevention indicator received in the uplink frames of a base station, for not carrying out speech decoding and encoding, and forwarding the speech information, possibly modified according to the control information of said uplink frame, to the second base station in the downlink frames.

5. A mobile communication system as claimed in any one of claims 1, 2, 3 or 4, characterized in that bad uplink frames comprise a bad frame indicator, the transcoder is responsive to the occurrence of the bad frame indicator in the received uplink frame, for inserting the speech encoding information of the previous frame in the frame to be sent forward, and removing the bad frame indicator.

6. A mobile communication system as claimed in claim 5, characterized in that the transcoder is responsive to the occurrence of the bad frame indicator in several successive uplink frames it has received, for carrying out predetermined muting operations to the speech encoding information without decoding it prior to packing them into frames, and sending them forward, and for removing the bad frame indicator.

7. A mobile communication system as claimed in 6, characterized in that the frames are TRAU frames in accordance with the GSM recommendation 08.60 or 08.61, said muting operation corresponds with the GSM recommendation 06.11 or 06.21 without decoding.

8. A mobile communication system as claimed in any one of claims 1, 2, 3 or 4, characterized in that the frames are TRAU frames in accordance with the GSM recommendation 08.60 or 08.61, all the operations, such as muting, associated with comfort noise generation are carried out as determined in the GSM recommendations 06.11 or 06.21 and 06.12 or 06.22 and 06.31 or 06.41.

9. A mobile communication system as claimed in claim 8, characterized in that the transcoder is responsive to receiving, during discontinuous transmission in the uplink direction, a TRAU frame which is a valid SID frame according to the GSM recommendation 06.31 or 06.41, for carrying out comfort noise updating and generation according to the GSM recommendation 06.12 or 06.22, without decoding.

10. A mobile communication system as claimed in claim 8, characterized in that the transcoder is responsive to receiving, during discontinuous transmission in the uplink direction, a frame which is marked with a BFI bit value 1 indicating it as a bad frame or an idle speech frame, for continuing generation of comfort noise according to the GSM recommendation 06.12 or 06.22 without decoding.

11. A mobile communication system as claimed in any one of claims 1, 2, 3 or 4, characterized in that the frames are TRAU frames corresponding with the GSM recommendation 08.60 or 08.61, the transcoder is responsive to receiving from the A interface a TRAU frame, which is a normal speech frame, for changing the type of frame to a normal downlink speech frame and sending the frame forward to the base station.

12. A mobile communication system as claimed in claim 11, characterized in that the frames are TRAU frames corresponding with the GSM recommendation 08.60 or 08.61, the transcoder is responsive to receiving from the A interface a TRAU frame, which is a normal speech frame, for changing the type of frame to a normal downlink speech frame, setting the SP bit and the spare bits to 1.

13. A mobile communication system as claimed in claim 12, characterized in that the transcoder is responsive to receiving a TRAU frame, during discontinuous transmission in the uplink direction, from the A interface, which TRAU frame can be interpreted as a frame for comfort noise updating or generating according to the recommendation 06.31 or 06.41, for changing the frame downlink direction to a frame having the SP bit value 0, and a SID code word set to the not used speech parameters, and the rest of the not used parameters having the value 0.

14. A mobile communication system as claimed in any one of claims 1, 2 or 3, characterized in that the transcoder is responsive to the fact that the data received from the second transcoder does not comprise frames due to the uplink frames the transcoder receives having a speech encoding disabled indicator, for sending an error message in the downlink direction to the base station which sends the error message to the mobile services switching center in the uplink direction.

15. A mobile communication system as claimed in any one of claims 1, 2, 3 or 4, characterized in that the mobile services switching center or centers controlling the call send(s) information to the base stations of the calling and called mobile station, and possibly other network elements associated with the call as well, that speech encoding prevention is to be used during the call.

16. A mobile communication system as claimed in any one of the previous claims, characterized in that the frames are TRAU frames corresponding with the GSM recommendation 08.60 or 08.61, and that the said speech encoding disabled indicator comprises a value determining the new TRAU frame type in the frame type field, or a TRAU frame of free control bits or a combination thereof according to the GSM recommendation 08.60 or 08.61.

17. A mobile communication system as claimed in any one of the previous claims, charactarized in that the frames are TRAU frames corresponding with the GSM recommendation 08.60 or 08.61, and that the transcoder carries out all the normal operations to the uplink frames comprising a speech disabled indicator, except decoding.

18. A mobile communication system as claimed in any one of the previous claims, characterized in that the frames comprise synchronization information, and that there exists synchronization between the transcoders essentially similar to synchronization between the base station and the transcoder.

19. A mobile communication system as claimed in claim 18, characterized in that the synchronization between the base station and the transcoder as well as synchronization between the transcoders correspond with the GSM recommendation 08.60 or 08.61.

* * * * *